United States Patent [19]

Komori

[11] 4,255,099
[45] Mar. 10, 1981

[54] OIL SEPARATOR FOR COMPRESSOR

[75] Inventor: Haruyuki Komori, Chiba, Japan

[73] Assignee: Seiko Keiki Kabushiki Kaisha, Chiba, Japan

[21] Appl. No.: 973,588

[22] Filed: Dec. 27, 1978

[30] Foreign Application Priority Data

Dec. 29, 1977 [JP] Japan ................ 52-177968

[51] Int. Cl.³ .............. F04C 29/02; B04C 5/04; B01D 53/24
[52] U.S. Cl. ............................ 418/97; 55/337; 55/459 R; 55/467
[58] Field of Search ................. 418/97–100, 418/93; 55/329, 337, 459 R, 467; 62/470, 473

[56] References Cited

U.S. PATENT DOCUMENTS

| | | | |
|---|---|---|---|
| 1,672,571 | 6/1928 | Leonard | 418/98 |
| 3,778,984 | 12/1973 | Lawser | 55/459 R |
| 4,070,166 | 1/1978 | Emanuelsson | 418/97 |

*Primary Examiner*—John J. Vrablik
*Attorney, Agent, or Firm*—Robert E. Burns; Emmanuel J. Lobato; Bruce L. Adams

[57] ABSTRACT

An oil separator which is accomodated within a compressor utilized in a comparatively small refrigerator such as an automobile air conditioner. Generally, an oil separator is arranged next to an outlet port of the compressor in order to separate lubricant intermixed in the compressed gaseous refrigerant therefrom. The oil separator is provided with a double barrelled cylindrically shaped separation chamber, the one end of which is blocked and the other end of which is connected with multi layered filter elements and further is blocked by an end plate thereon. The separation chamber is provided with a gas conduit opening in the tangential direction thereof to communicate with a passage. Furthermore a pipe is projected extending over one end of said separation chamber to a pressure chamber in the compressor. Accordingly gaseous refrigerant loaded with lubricant therein, is introduced into the separation chamber through said gas conduit and undergoes a centrifugal force and so lubricant is separated through said separating action and is passes through multilayered filter elements to thereby be repeatedly separated. The gas which oil is separated therefrom, is introduced into a pressure chamber and is exhausted from an outlet port.

3 Claims, 7 Drawing Figures

OIL SEPARATOR FOR COMPRESSOR

BACKGROUND OF THE INVENTION

This invention relates to an oil separator which is attached to the outlet side of a compressor such as the type used in a comparatively small refrigerator, for example, for an automobile air conditioner to thereby separate lubricant from gaseous refrigerant. The gaseous refrigerant (hereinafter called as gas), which is exhausted from the compressor of an automobile air conditioner, is moderately loaded with particles of lubricant which is intermixed with the gas in the compressing operation so that if this gas is directly supplied to a condenser, this gas exerts a bad influence upon heat transfer in the heat transmission surface of the cooling pipes and thus cooling is extremely impeded.

SUMMARY OF THE INVENTION

The object of this invention is to effectively remove the lubricant intermixed in the gas before it enters into a condenser. Another object of the invention is to provide an oil separator which has a simple construction and has good selectivity. Hereafter, this invention is described with reference to the drawings of the embodiments.

DESCRIPTION OF THE PREFERRED EMBODIMENTS

Figure 1:
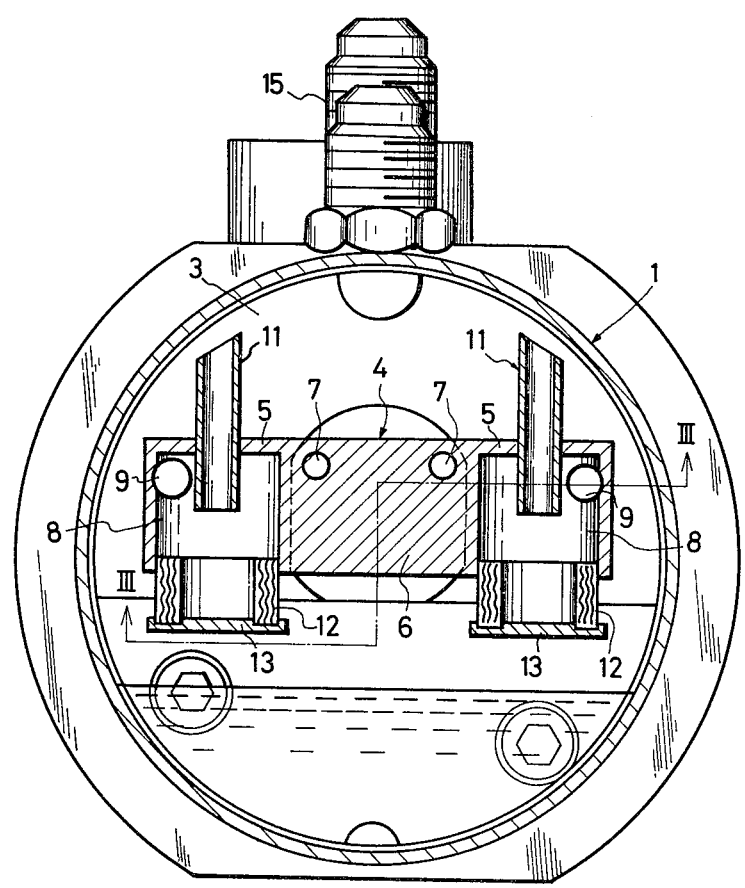
FIG. 1 is a cross-sectional front view of the main part of the compressor provided with an oil separator with reference to our invention.
Figure 2:
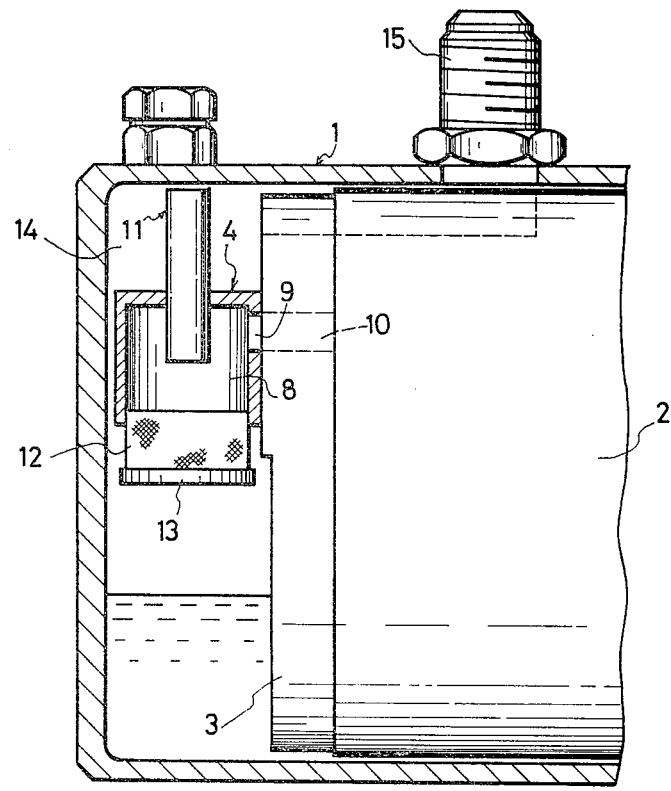
FIG. 2 is a cross-sectional side view of the compressor as shown in FIG. 1.

FIGS. 1 and 2 are views of a main part of the gas compressor which is provided with a oil separator of this invention. Reference numeral 1 is a housing of the compressor and reference numeral 2 is a cylinder with an inner circumferance which is accomodated in said housing 1 and on the respective ends of which a front side block (which is omitted in the figure) and rear side block 3 are attached respectively, and these members define a cylinder chamber with an inner circumference. Also a rotor, on which a plurality of vanes are mounted, is traversely installed in said cylinder chamber and in turn said vanes separate said cylinder chambers into a plurality of compression chambers to carry out successively preferable compressing operations in proportion to the speed of revolution of the rotor.

Figure 3:
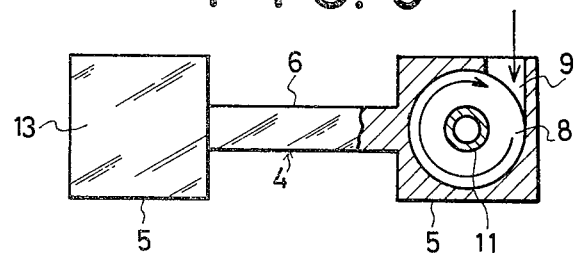
FIG. 3 is a cross-sectional view taken along the line III—III in FIG. 1.

Reference numeral 4 is the oil separator of this invention which is accomodated in said housing 1 and is arranged to the central outer side of the rear side block 3. Said FIGS. 1 and 2 show a double barrelled oil separator with two separation chamber as a example. Said oil separator is mainly comprised of cubic main bodies of the separator 5,5 which are made from metal such as brass. The main bodies of the separator 5,5 are connected by a connecting member 6 there between which is fixed to the rear side block 3 by means of thread 7,7. The separator bodies 5,5 are centrally provided with a cylindrical separation chamber 8 whose upper portion is blocked. Gas conduit 9 is directed in the tangential direction of the cylindrical separation chamber 8, and is eccentric relative to the center of the separation chamber, as shown in FIG. 3. The gas conduit 9 which communicates with said separation chamber 8 and further said conduit communicates with the outlet port side of the cylinder 2 through the intermediary of a passage 10 which penetrates through the rear side block 3 so that high pressure gas loaded with lubricant which is exhausted from the cylinder chamber maybe introduced into the oil separator 4. Reference numeral 11 is a pipe to therethrough introduce gas, housing a center axis coincident with the center of the said separation chamber 8 and upwardly inserted therein and which is fixed on the upper surface of said separator body 5 by a mechanical means such as welding. The upper portion of the pipe 11 extends over the separator body 5 outwardly and has a acute end portion or biased end portion which is cut diagonally and provided with a suitable clearance between the inner wall of said housing 1 and pipe end. On the other hand, the lower portion of the pipe 11 is opened to the nearly intermediate area of said separation chamber 8 intermediate the top and bottom thereof so that the gas which is introduced in said separation chamber 8 is exhausted outwardly from the separation chamber 8 through the pipe 11.

Reference numeral 12 is a separation element multilayered and comprised of annular wire nets such as a gas-permeable material. One end of this separator element is blocked and the other end opening of which is co-axial with said separation chamber, and the separator element is fixed to the lower opening of said separation chamber 8 by way of welding so that lubricant separated by the centrifugal force within the separation chamber 8 is exhausted through the separator element 12. In the oil separator with reference to our invention, the high pressure gas, which is exhausted from the outlet port of the cylinder, passes through a passage 10 and a gas conduit 9 and is introduced into the upper area of the separation chamber 8 and passes along the circular inner wall and has imparted thereto a centrifugal force so that lubricant, which is contained in the gas, is separated from the gas by its centrifugal force and is returned into lubricant stored in the housing 1 through the separator element 12. Further the gas, which undergoes the centrifugal separating operation, is rotated from the upper to the lower portion of the separation chamber 8 and passes through the pipe 11 and is exhausted into a pressure chamber 14 so that the gas comes into collision with the circumferatial inner wall of the housing 1 to effect oil separating by the collision action therewith.

Figure 4:
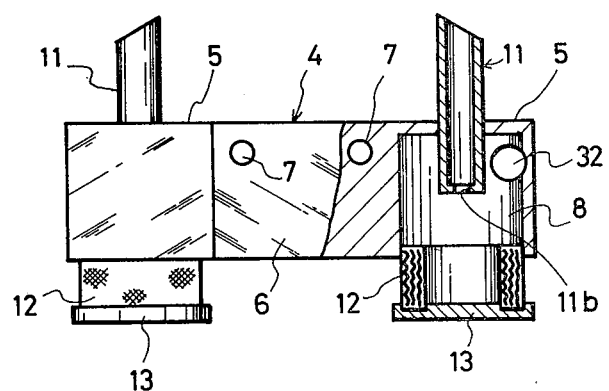
FIGS. 4 and 5 are respectively a side view of a modified embodiment of the oil separator in FIG. 1.

The gas, which is not passed through the pipe 11, is partially passed through the separator element and is exhausted into the pressure chamber 14 while lubricant which is contained in the gas, is repeatedly separated by collision action to and within the separator element. The gas from which the oil is repeatedly separated is introduced into the pressure chamber 14 and is exhausted from the outlet port 15 to a condenser. The oil which is returned into lubricant stored in the housing 1, is used again. FIG. 4 is a modification of the above-described embodiment of this invention, wherein the lower opening 11b of the pipe 11 is formed in a smaller diameter than the inner diameter of the pipe and thus when the gas passes through from the separation chamber 8 to the pipe 11 and further through said opening 11b, the fluid speed is increased by a so-called throttle effect so that oil separating operation cn be more improved in the collision against the housing 1.

Figure 5:
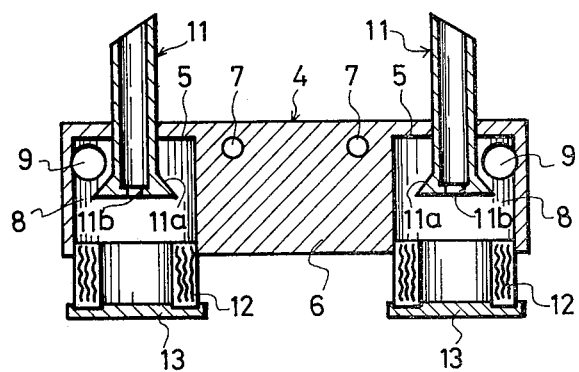

FIG. 5 is a further modification of this invention wherein a member corresponding to a member in above-described embodiment has the same reference and so detailed description thereof is omitted.

In FIG. 5, upon the lower circumferential pipe portion, a taper portion 11a is formed to broaden toward the pipe end. It makes the gas stream extremely narrower and also the lower opening 11b of the pipe 11 is formed to be smaller in diameter than the inner diameter of the pipe so that the gas stream, which is passed through from the lower area of the chamber to the inside of the pipe 11, is made repeatedly narrower. Accordingly the gas, which is introduced into the upper area of the separation chamber 8, passes through along the circular inner wall and has imparted thereto a centrifugal force so that lubricant, which is contained in the gas, is separated from the gas by its centrifugal force and is returned into lubricant stored in the housing 1 through the separator element 12. On the other hand, the gas, which undergoes a centrifugal separating operation, is rotated from the upper to the lower portion of the separtion chamber but the gas stream is made extremely narrower by means of the lower end of the taper portion 11a of the pipe 11 and this so-called throttle effect makes the circumferential speed of the fluid higher and energized it with centrifugal force so that the oil separating operation can be more improved.

Almost all of the gas, which is rotated in the lower area of said separation chamber 8 is passed from the lower opening 11b of the pipe 11 through the pipe and is exhausted into the pressure chamber 14. When the gas passes through the opening 11b of the pipe 11, the fluid speed is increased by its throttle effect and when the gas is exhausted from the pipe 11 to the pressure chamber, the gas comes into collision with the inner circumferential wall of the housing 1 so that oil separating can be repeatedly carried out by way of the collision operation. On the other hand, the gas which is not passed through the pipe 11, is partially passed through the separator element and is exhausted into the pressure chamber 14, while lubricant which is contained in the gas, is repeatedly separated through the collision action thereof.

Thus, as described in the forementioned embodiment, the gas from which the oil is repeatedly separated is introduced into the pressure chamber 14 and is exhausted from the outlet port 15 to a condenser.

Figure 6:
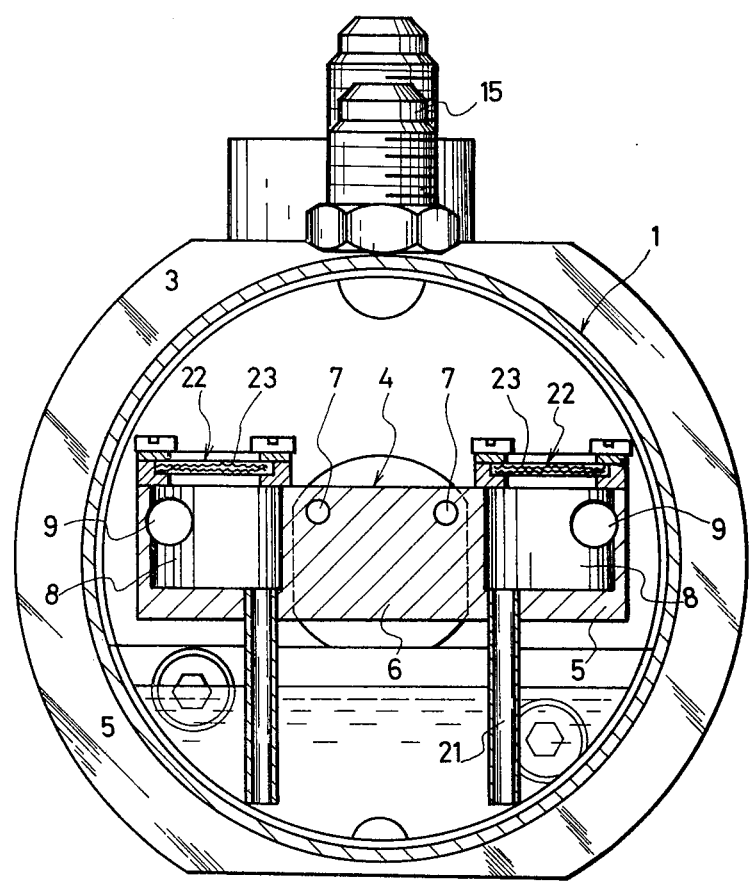
FIG. 6 is a cross-sectional front view of the main part of another preferred embodiment of the compressor with reference to our invention.

Next, another preferred embodiment of this invention is described with reference to the accompanying drawings. FIG. 6 shows a front view of a main part of the gas compressor which is provided with an oil separator of this invention. Reference numeral 1 is a housing of the compressor and reference numeral 2 is a cylinder with an inner circumference which is accommodated in said housing 1 and on both ends of which a front side block (which is omitted in the figure) and a rear side block 3 are attached, and these members define a cylinder chamber with an inner circumference.

Also, a rotor, on which a plurality of vanes are mounted, is traversely installed in said cylinder chamber and in turn said vanes separate said cylinder chamber into a plurality of compression chambers to carry out successively preferable compressing operations in proportion to the speed of revolution of the rotor. Reference numeral 4 is an oil separator of this invention which is accommodated in said housing 1 and is arranged at the central outer side of the rear side block 3. Said FIG. 6 shows a double barrelled oil separator with two separation chambers as a example. Said oil separator is mainly composed of cubic main bodies of the separator 5, 5 which are made from metal such as brass and said main bodies of the separator 5,5 are connected by a connecting member 6 therebetween and fixed to the rear side block 3 by means of threads 7,7.

Said separator bodies 5,5 are centrally provided with a cylindrical separation chamber 8 whose upper end is opened. A gas conduit 9 is directed in the tangentical direction of the cylindrical separation chamber 8, and is eccentric relative to the center of the separation chamber, as shown in FIG. 3 of the aforementioned embodiment. The gas conduit 9 which communicates with said separator chamber and said conduit 9 communicates with the outlet port side of the cylinder 2 through the intermediary of a passage 10 which penetrates through the rear side block 3 so that high pressure gas containing lubricant which is exhausted from the cylinder chamber. On the upper surface of said separation chamber, a separator element composed of multilayered wire nets such as a gas permeable material is extended over the opening and is fixed to the separator main bodies 5,5 by means of a holder plate 23 so that gas, which undergoes the centrifugal separating operation in the separation chamber 8, can be exhausted therethrough. Reference numeral 21 is a pipe which is projected from the lower end of the separator main body and communicates with the bottom of the separation chamber 8 and the lower end of said pipe 13 is sunk under the lubricant stored in the under of the housing 1. In the oil separator with reference to said embodiment of our invention, the high pressure gas, which is exhausted from the outlet port of the cylinder, passes through a passage 10 and a gas conduit 9 and is introduced into a separation chamber 8 and further passes along the circular inner wall and is energized with a rotation motion so that lubricant, which is contained in the gas, is separated from the gas by its centrifugal force and is returned to the lubricant stored in the housing through the pipe 13. On the other hand, the gas from which the oil is separated, is introduced into the pressure chamber 14 and is exhausted from the outlet port 15 to a condenser.

Figure 7:
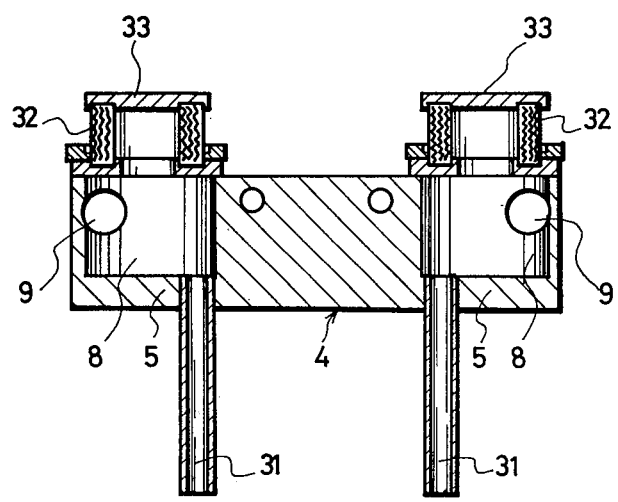
FIG. 7 is a side view of further modified embodiment of the oil separator in FIG. 6.

FIG. 7 is an oil separator of another modified embodiment with reference to our invention.

Separator elements 32, 32 in said embodiment, are composed of multilayered annular wire nets and one end of which is blocked by the upper plate 33 and the other end of which is co-axial with said separation chamber and is fixed to the upper opening of said separation chamber by way of welding. When the gas, from which oil is separated by way of centrifugal action, passes through said separator elements 32, 32, contact area of the gas is more increased so that the separation effect may be improved.

Aforementioned above, the oil separator with reference to our invention, is provided with a cylindrically shaped separation chamber the one end of which is opened and includes a gas conduit tangential to the direction of the cylindrical inner wall of said separation chamber. A gas permeable material is attached to the opening of said separation chamber. Accordingly gaseous refrigerant which contains lubricant therein and is introduced from a gas conduit to a separation chamber, undergoes a centrifugally separating action within the separation chamber so that gaseous refrigerant may have good selectivity. Also construction of the oil separator itself and attaching thereof can be so comparatively simplified that this oil separator is most suitable for use with a compressor of an automobile air conditioner.

I claim:

1. In a gas compressor having an outer compressor housing, an inner compressor housing having a compressor rotor therein, wherein said inner compressor housing is smaller than said outer compressor housing and disposed within said outer compressor housing and defines a pressure chamber within said outer compressor housing between said outer and said inner compressor housings, the improvement comprising: an oil separator within said outer compressor housing and within said pressure chamber, said oil separator comprising means defining a plurality of cylindrical separation chambers each having a respective gas inlet conduit oriented to introduced gas tangentially into its corresponding cylindrical separation chamber and each cylindrical separation chamber having an open end and a closed end, a plurality of gas-oil separation elements each disposed for closing an open end of a respective cylindrical separation chamber, each gas-oil separation element comprising a gas permeable material effective for separating oil particles carried by a gas from the gas as it passes through said gas-oil separation element, and a plurality of gas outlet pipes each extending from the interior to the exterior of a respective cylindrical separation chamber for providing communication between the interiors of the respective cylindrical separation chambers and the pressure chamber, wherein the respective ends of said gas outlet pipes remote from said cylindrical separation chambers terminate adjacent said outer compressor housing so that gas flowing out of said cylindrical separation chambers through said gas outlet pipes and carrying oil particles impacts against said outer compressor housing to effectuate gas-oil separation; and said inner compressor housing including gas outlet openings opening into the gas inlet conduits of said oil separator for separating oil particles carried by gas discharged from said inner compressor housing.

2. In a gas compressor according to claim 1, wherein the respective remote end portions of said gas outlet pipes generally conform to the shape of said outer compressor housing.

3. In a gas compressor according to claim 1 or 2, wherein said gas outlet pipes each have an inner diameter along their length, and an end portion within the respective cylindrical separation chamber having an inner diameter smaller than the inner diameter along the outlet pipe length for constricting gas flow through the pipe end portion having the smaller inner diameter.

* * * * *